United States Patent [19]

Vogel

[11] Patent Number: 4,799,957

[45] Date of Patent: * Jan. 24, 1989

[54] INTERCALATED GRAPHITE CONTAINING ELECTRICAL MOTOR BRUSHES AND OTHER CONTACTS

[75] Inventor: Ferdinand L. Vogel, Whitehouse Station, N.J.

[73] Assignee: Intercal Company, Port Huron, Mich.

[*] Notice: The portion of the term of this patent subsequent to Jul. 31, 2001 has been disclaimed.

[21] Appl. No.: 15,164

[22] Filed: Feb. 17, 1987

Related U.S. Application Data

[63] Continuation of Ser. No. 770,155, Aug. 27, 1985, abandoned.

[51] Int. Cl.$^4$ ............................................. C22C 29/00
[52] U.S. Cl. ........................................ 75/243; 75/230; 252/502; 252/503; 252/506; 252/509; 419/11; 419/48; 419/48; 419/68; 501/99; 501/103
[58] Field of Search ............... 252/502, 503, 506–509; 419/11, 48, 49, 68; 75/230, 243; 501/99, 103

[56] References Cited

U.S. PATENT DOCUMENTS

| | | | |
|---|---|---|---|
| 4,565,649 | 1/1986 | Vogel | 252/506 |
| 4,604,276 | 8/1986 | Oblas et al. | 252/506 |
| 4,642,201 | 2/1987 | Vogel | 252/506 |
| 4,645,620 | 2/1987 | Palchan et al. | 252/506 |

Primary Examiner—Stephen J. Lechert, Jr.
Attorney, Agent, or Firm—Kenyon & Kenyon

[57] ABSTRACT

An electric motor brush or other electrical contact fabricated with intercalated graphite exhibits improved electrical conductivity, strength and performance when compared with electrical brushes made with non-intercalated graphite or with carbon. Such contacts may be formed by filling a mold of the appropriate shape with intercalated graphite powder and applying sufficient pressure and heat to produce a coherent mass. The ability of intercalated graphite powder to be compacted in such a fashion leads to economic methods of manufacturing electrical contacts. The properties of these contacts may be further improved by the incorporation of metal powder, organic polymers or ceramic powders into the intercalated graphite prior to pressing.

20 Claims, No Drawings

INTERCALATED GRAPHITE CONTAINING ELECTRICAL MOTOR BRUSHES AND OTHER CONTACTS

This is a continuation of application Ser. No. 770,155, filed Aug. 27, 1985, now abandoned.

This invention relates to electrical contacts such as electrical motor brushes and the like formed from intercalated graphite.

BACKGROUND OF THE INVENTION

An electrical motor produces its rotating mechanical power as the result of forces generated by the interaction between the stationary magnetic field of the stator and the magnetic field developed in the rotor windings as an electrical current passes through these windings. In order to obtain an electrical contact between the rotor and a power source it is sometimes necessary to employ a rotating or sliding electrical contact. The rotating part of the contact is a commutator which is made of copper segments connected to the windings. These segments allow the current to pass through the windings and are situated so the current may be reversed as the rotor rotates. In addition, there are two or more stationary contacts called brushes. These brushes contact the rotating commutator segments, thus allowing conduction of electricity between a stationary power source and the rotating windings.

The brushes are typically made of a carbon and graphite mixture, sometimes with a metal powder such as copper powder added. The brushes are usually manufactured by mixing the carbon and/or graphite and, if desired, the metal powder with a binder. The resulting mixture is formed into a large block and is baked at a high temperature. The block is then cut into plates, and the plates are cut into individual brushes of the desired size.

In selecting a brush and/or a brush material, there are several properties or factors that must be considered. One such property is specific resistance, which is the measure of the brushes ability to carry an electrical current. The specific resistance is a function of the cross-sectional area of the brush and electrical conductivity of the brush material. Ideally, a brush should have a low specific resistance in order to lower the voltage drop across the brush and thereby reduce the power loss.

Another important property is brush hardness. Hardness gives an indication of how the brush will operate when in use. A very hard brush tends to vibrate and slip, while a softer one runs more quietly. The strength of a brush is also important since it determines the ability of the brush to withstand compression, tension and shear.

Another factor which must be considered in evaluating a particular brush or brush material is brush wear and abrasiveness. With continued operation of an electrical motor an insulating deposit is seen to build up on the commutator. Therefore, a certain amount of abrasion by the brushes on the commutater is desirable to remove this build up. However, excessive abrasiveness will cause the brushes to wear much too quickly, thus bringing the motor operation to a halt. Therefore, any brush and/or material selected must show a proper balance between wear and abrasion.

One last factor that must be considered is contact voltage drop. This is a meausre of the electric contact between the brushes and the commutater. Clearly, the better the electrical contact, the more efficiently the motor will run.

The properties outlined above are also important in the design and manufacture of electrical contacts such as pantograph contacts, sliding or breaking electrical contacts, conducting gears and bearings, and electrostatic discharge machinery tools. The above properties are important in selecting the materials used in these devices as well.

It is therefore an object of this invention to provide improved electric motor brushes and other electrical contacts containing graphite.

It is another object of this invention to provide electric motor brushes and other electrical contacts having low specific resistance and a long, useful life.

It is still another object of this invention to provide improved electrical contacts having good wear and current carrying capabilities.

It is still another object of this invention to provide electrical motor brushes and other electrical contacts with a low short circuit current.

SUMMARY OF THE INVENTION

According to the present invention, these and other objects are achieved by an electrical contact containing intercalated graphite. The intercalating species may be any species which produces an intercalated graphite which is stable in air and at elevated temperatures such as a temperature up to 600° C. or higher. In general, these species include but are not limited to metal halides of transistion elements, of Group III A, IV A, V A and VI A metals or metalloids, as well as, the corresponding metals and metalloids themselves. In addition, halogens such as $F_2$ and $Br_2$ and interhalogens such as IBr may be employed as intercalating species in the present invention, as well.

The graphite that is to be intercalated may be any natural or synthetic graphite and may be employed in a powdered or an exfoliated form.

The intercalated graphite may be compressed uniaxially (such as in a die or mold) or isostatically (such as in a pressurized fluid) to form a compacted body of the desired shape. Alternatively, the intercalated grahite may be compressed into a blank and subsequently milled into the desired shape.

Electrical contacts from intercalated graphite may be fabricated individually to avoid the necesity for cutting from a large block. This makes the manufacture of such contacts much easier and involves less wasted materials.

A metal powder may be mixed with the intercalated graphite prior to forming the electrical contact. Also, particles of intercalated graphite may be metal-plated prior to being formed into a contact. In another embodiment, the intercalated graphite may be mixed with a polymer or a ceramic powder.

The resulting electrical contacts have superior quality with low specific resistance, low wear, good electrical conductivity and improved friction characteristics.

DETAILED DESCRIPTION OF THE INVENTION

When graphite is intercalated, it is converted to a "synthetic" metal and displays many metal-like properties. Thus intercalated graphite is observed to have increased conductivity, luster and ductility. For example, when ordinary graphite is compression molded, a body that is extremely weak and friable is formed. However, a body formed with intercalated graphite is found to have coherence and strength proportional to the magnitude of the temperature and pressure of the pressing. This increased strength of the graphite is due to the metal-like ductility exhibited by graphite that has been intercalated.

The intercalated graphites suitable for use in the invention are those which are stable in air and at elevated temperatures. The most stable intercalated compounds are those intercalated with certain metal halides or metals, the main requirement being that the intercalating species is capable of exchanging charge with the host graphite.

The metal halides used in the present invention are halides of transistion elements, halides of Group III A, IV A, V A or VI A metals and metalloids. The preferred Group III A elements include boron, aluminum, gallium and indium.

Graphites intercalated with these halides are formed in general by heating a mixture of graphite and the intercalating species to between 200° C. and 900° C. in the presence of chlorine gas for several hours. It is believed that the chlorine attacks the carbon atoms in the graphite lattice, thus forming positively sites throughout the graphite. The chlorine also reacts with the intercalating species to produce a negatively charged species which is attracted to and held by the positively charged carbon atoms thereby intercalating the graphite. This explanation of the mechanism of intercalation, however, is not to be definitive or a limitation of the invention.

The metal intercalated graphites may be produced by preparing a metal halide intercalated graphite by the process described above and then reducing the metal halide in situ in the presence of a reducing agent thus producing a graphite containing a metal in its lattice structure. Suitable reducing agents include hydrogen gas, lithium biphenyl and certain hydrides (e.g. $LiAlH_4$, $NaBH_4$, $NaH$, $CaH_2$). The reduction typically takes place at between 200° C. to about 300° C. It is believed that all the metal halides, described above, may be used to produce metal intercalated graphites that are equally as stable.

Of the above-described species, the metal halides are preferred and of these halides the copper chloride, nickel chloride and chromium chloride are the most preferred. If, however, a metal intercalated graphite is desired the graphite preferrably contains copper, nickel or silver which has been reduced in situ from the corresponding halide.

The graphite employed in the present invention may be any of the known graphites and may be used in powder, fiber, flaked or exfoliated form. In fact, it is believed that using exfoliated graphite facilitates the introduction of the intercalating species into the graphite lattice.

The electrical contacts of the invention may be fabricated by compacting the intercalated graphite in a simple die or mold at an applied pressure of about 1,000 lbs per square inch (produce a barely coherent mass) to as high as is practically possible. For example a forming pressure of 150,000 psi produces a strong, useful member. Temperatures during compaction can range from room temperature, (i.e., about 20° C.) to about 1000° C. or higher, with the higher temperatures being preferred. Pressing times for these contacts range from about 2 to about 30 minutes.

The direction of the applied pressure should be normal to the desired direction of high electrical conductivity. Thus, in an electric motor brush, the direction of the applied pressure is normal to the longitudinal axis of the brush and normal to the shaft of the rotor on which the brush will be applied. In this manner, the basal plane, or the A axis of the intercalated graphite crystals is oriented parallel to the longitudinal axis of the brush (i.e., the direction of current flow), and the C axis of the crystals, or the axis normal to the basal plane, is oriented perpendicular to the current flow and parallel to the direction of the rotation of the motor.

The materials used for the mold or die are important because intercalated graphite at elevated temperatures and pressures will adhere to most metals, such as steel, which are commonly used for this purpose. Therefore, it is desirable either to fabricate the die parts from solid polytetrafluoroethylene or a similar non-stick material, or to coat the metal of the die or mold with a spray-on fluoropolymite telomer powder. A suitable commercial spray is GP 1589, manufactured by Acheson Colloids, Co., Port Huron, Mich. In addition, coatings of fine oxide powders, such as $Al_2O_3$, or this foils of aluminum may also be useful as parting material.

By this process, an electrical contact having a low series resistance, high cross resistance, low wear factor, and thus good electrically conductivity and friction characteristics is formed.

The electrical contacts of the invention may also be fabricated through the use of isostatic pressing. The intercalated graphite material is placed in a bag-like container, the container is evacuated and is then submerged in a pressurized medium. Unlike typical mold or die presses which apply pressure in only one direction, isostatic pressure applies an essentially uniform pressure around the entire pressed object. In addition, isostatic pressing generates much higher pressures than the molds or dies and, therefore, produce higher density and strength in the molded contact.

The bag-like container used in isostatic pressing is typically a shape-retaining rubber-like housing that will transfer pressure evenly around its perimeter. The housing will be shaped to conform with the desired final shape of the intercalated graphite contact. The pressurized medium may be any suitable fluid such as ethylene glycol, hydraulic oil and the like.

Due to the large volume changes experienced when fabricating intercalated graphite members (especially when exfoliated graphite is one of the starting materials), some uniaxial pre-pressing of the intercalated graphite using conventional means is typically done before isostatic pressing is performed. In fact, for the present invention pre-pressing may be necessary, as electrical contact often need a certain molecular alignment in order to function properly (see above). This alignment is not possible in isostatic pressing.

Where it is necessary or desirable because of strength or conductivity requirements, the electrical contacts of the present invention may have a metal component. The intercalated graphite particles may be mixed with a metal powder such as copper, nickel, iron, silver, or other like powders and then pressed into a solid body in the manner described above. The intercalated graphite bonds well with the metal due to increased graphite ductility created by intercalation. The metal powder content may range from about 2 wt percent to about 90 wt percent with a range of 15 wt percent to 30 wt percent typically giving the best results.

A similar result may be achieved if the intercalated graphite particles are metal plated prior to pressing as well. The particles may be plated using any of the methods known in the art, such as electrodeless plating.

In another embodiment, the intercalated graphite may be mixed with a thermoplastic or thermosetting polymer and pressed into a electrical contact in the manner described above. The polymer content can range from about 1 wt per cent to about 30 wt per cent based on the total weight of the composite. Preferred polymers for this use include epoxy resins, thermoplastic resins, aromatic resins, polyesters, aldehyde resins, aromatic resins, polyamides, polyolefins of high and low molecular weight and varying degrees of crosslinking, polycarbonates, polyfluorinated olefins, polymethanes, polyethers and the like.

When a thermosetting polymer is used, the intercalating graphite would typically be mixed with a thermosetting liquid or powder resin, and formed into the desired shape. The mixture is then cured using techniques well-known to persons skilled in the art. When a thermoplastic polymer is employed, the polymer (which is typically a powder) is mixed with the intercalated graphite and the mixture is formed into the desired shape using temperature and pressure in much the same way as the intercalated grahite by itself would be formed into the desired shape.

In still another embodiment, conductive ceramic composites may be formed by mixing intercalated graphite with from about 5 percent to about 85 percent by weight of a ceramic powder. The ceramic/intercalated graphite composites are formed in much the same manner as the metal/intercalated graphite composites described above. The preferred ceramic powders include silicon nitride, boron carbide, silicon carbide, partially stablized zirconia, titanium oxides and mixtures thereof.

A problem, which is sometimes encountered in members or structures of metal halide intercalated graphite, is that of environmental instability particularly when the intercalated graphite members are stored or used under extremely high humidity. This stability problem takes the form of cracking, swelling and corrosion of the intercalated graphite member which appears after 1 to 6 months of storage or use. It is unclear what causes this lack of environmental stability, however, it does appears to be a function of intercalated graphite member forming pressures and temperature, (i.e., the higher the forming pressure and temperature, the more likely it is that this instability will appear) and possibly the type of graphite chosen as the starting material.

The present invention is not affected by this problem when low forming pressures and temperatures such as 10,000 psi and 20° C. are used and when the uses of the intercalated graphite members and structures are limited to normal humidity applications. However, the problem may also be solved by mixing the intercalated graphite powder with small amounts of transition metals, such as nickel, copper, silver, molybdenum or tungsten, prior to forming of an intercalated graphite member. Contacts of this composition which may contain from about 2 vol. % to about 30 vol. % metal powder experience none of the environmental stability problems described above even though a high forming pressure and temperature is used and high humidity is present. After the metal powder has been mixed with the intercalated graphite, this mixture may be handled in the same way as the intercalated grahite itself (see above).

From the foregoing, it is evident that the present invention provides a novel electrical contact capable of being formed easily in simple dies or molds and which has improved electrical conductivity, improved strength and hardness and extended life. For example, an electric motor brush formulated in accordance with the present invention typically has a specific resistivity which is 50 per cent less than that exhibited by a graphite/carbon brush. In addition, the intercalated graphite contacts wear better and appear to have a life expectancy 50 per cent (70 per cent if metal powder is included) longer than graphite/carbon brushes.

In addition to motor brushes, other intercalated graphite electrical contacts may be formed. For example, the wear characteristics of these contacts make them ideally suited for sliding or beaking electrical contacts such as pantographs, potentiometers and the like.

A second possible application is in small to medium size gears and bearings used in printers, cash registers and the like. These members must not only conduct electricity but must also self-lubricate. Intercalated graphite is quite useful in these application because of its improve strength, wear and conductivity as well as its lubricating properties.

Still another application for intercalated graphite contacts is in electrostatic discharge machinery (EDM) Tools. This type of machinery is used to form objects by passing a high voltage spark between the EDM Tool and a work piece. This causes the work piece to adopt the shape of the EDM Tool. Due to the nature of this process the tool characteristics are very important. For example, if the tool is made from a metal, the tool tends to melt during the process. A graphite/copper composite has also been attempted. While this tool performs well in the process, the tool is difficult to form (i.e., the graphite is mixed with pitch at a high temperature to form a porous mass. The mass must then be milled to the desired shape) and, in addition, the amount of copper that may be used is limited (by the size and number of the pores of the graphite/pitch composite).

In contrast, intercalated graphite may be easily formed into the shape desired and there is no limit to the amount of copper powder which may be mixed with the intercalated graphite. While all the intercalated graphite species discussed above are suitable for use in EDM Tools, a particularly useful intercalated graphite in this application is a graphite intercalated with cadmium chloride. Cadmium chloride is a spark quencher and therefore may be helpful in controlling the electrical spark used in the EDM process. These factors coupled with the strength and conductivity characteristics of intercalated graphite make the cadmium chloride intercalated graphite idealy suited for use in EDM Tools.

The present invention is exemplified by the following examples, which are not intended to be limiting.

EXAMPLE 1

Graphite intercalated with copper chloride was prepared by mixing a quantity of graphite powder with a quantity of $CuCl_2$ to produce a mixture contains 48 wt per cent $CuCl_2$. This mixture was loaded into a glass reactor vessel and heated to 125° C. for 1/5 hours with dry nitrogen flowing through the vessel to remove any water present therein. The temperature of the reaction vessel was then raised to 500° C., the dry nitrogen gas flow was stopped and a flow of dry chlorine at a gauge pressure of about 3 to 6 inches of water was begun. The resulting reaction was continued for 4 hours. This treatment produced a free flowing black powder having a bulk density of from 0.18 to 0.34 gm/cm (depending on particle size). The intercalated graphite crystals are stage III and have a specific gravity of about 2.6 gm/cm$^3$.

EXAMPLE 2

An electric motor brush having dimensions of 5/8"×1"×4" was prepared from 120 gms. of a mixture containing 84 vol. % intercalated graphite prepared as in Example 1 and 16 vol. % copper powder. (Natural Copper Powder extra-fine #1400 from Atlantic Powder Metals, Inc., N.Y., N.Y.) The mixture was loaded into a 1"×4" steel mold, the mold having a 1"×4" strip of aluminum foil placed in the bottom thereof as a parting material. The mixture after being loaded into the mold was covered by a second 1"×4" strip of aluminum foil and a plunger was inserted into the mold. The mold was then heated to 200° C. and the plunger was used to apply a pressure of 50,000 psi to mixture for 3 minutes. The resulting brush conducted electricity parrallel to the 5/8" dimension.

EXAMPLE 3

160 gm of intercalacted graphite produced as outlined in Example 1 is thoroughly mixed with 40 gm of polypropylene. The mixture is then placed in a mold and subjected to a pressure of 1000 psi at a temperature of 190° C. for 3 minutes to produce an intercalated graphite/polymer matrix. This piece is useful as a gear blank for a toothed gear that must be lightweight, self lubricating and conducting.

EXAMPLE 4

An electrodischarge machine tool was formed from a mixture having 98 wt. % intercalated graphite made in accordance with Example 1 and 2 wt. % copper powder. The mixture was pressed at room temperature in a 0.33" ID cylindrical sheet mold to 50% of its ideal density (the theoretical maximum density to which the mixture could be compressed). The resulting compact was then inserted into a neoprene bag having an I.D. of 0.33". The bag was evacuated and sealed and then enclosed in the pressure cell of an isostatic pressing apparatus. The bag and its contents were heated to 100° C. and pressed for 30 minutes at a pressure of 150,000 psi. The resulting compact had a scleroscope hardness of 50.

EXAMPLE 5

A cylindrical rod having a diameter of 0.25" and a length of 4" was formed from the content of Example 4 by milling in a lathe. One end of the rod was fitted into the chuck of an electrodischarge machine and the rod was used to sink a 0.25" diameter hole into a test piece of steel.

What is claimed is:

1. An electrical contact comprising a compacted body formed from an intercalated graphite which is stable in air and at elevated temperature, said body being essentially free of separately added copper, nickel, silver, molybdenum or tungsten metal powder.

2. An electrical contact in accordance with claim 1 wherein the contact is an electric motor brush.

3. An electrical contact in accordance with claim 1 wherein the contact is a pantograph contact.

4. An electrical contact in accordance with claim 1 wherein the contact is a electrostatic discharge machinery tool.

5. An electrical contact in accordance with claim 1 wherein the contact is a gear.

6. An electrical contact in accordance with claim 1 wherein the intercalated graphite is intercalated with an intercalation species selected from the group consisting of a metal halide and a metal, wherein the metal halide is selected from the group consisting of a halide of a transistion element, a halide of a Group IIIA, IV A, V A and VI A metal or metalloid and the metal is selected from the group consisting of a transition element, a Group III A, IV A, V A and VI A metal or metalloid.

7. An electrical contact in accordance with claim 6 wherein said intercalation species is a metal halide.

8. An electrical contact in accordance with claim 7 wherein the metal halide, prior to forming said contact, is reduced in situ to a metal in the presence of a reducing agent thus forming a metal intercalated graphite.

9. An electrical contact in accordance with claim 7 wherein the metal halide is selected from the group consisting of copper chloride, nickel chloride, chromium chloride, and cadmium chloride.

10. An electrical contact in accordance with claim 1 further comprising a metal powder other than copper, nickel, silver, molybdenum or tungsten admixed wtih the intercalated graphite.

11. An electrical contact in accordance with claim 10 wherein the metal powder comprises from about 2 wt. per cent to about 90 wt. per cent of said contact.

12. An electrical contact in accordance with claim 1 wherein the powder particles are metal plated.

13. An electrical contact in accordance with claim 1 further comprising a polymer admixed with the intercalated graphite, the polymer being selected from the group consisting of a thermoplastic polymer and a thermosetting polymer.

14. An electrical contact in accordance with claim 13 wherein the polymer comprises from about 1 wt per cent to about 30 wt per cent of the contact.

15. An electrical contact formed by compacting intercalated graphite particles at a pressure of between about 1,000 pounds per square inch and about 150,000 pounds per square inch and at a temperature of between about 20° C. and about 1000° C.

16. An electrical contact in accordance with claim 15 wherein said pressure is generated uniaxially.

17. An electrical contact in accordance with claim 15 wherein said pressure is generated isostatically.

18. An electrical contact in accordance with claim 15 wherein the contact is formed by pre-pressing said particles uniaxially followed by an isostatic pressing.

19. An electrical contact in accordance with claim 1 further comprising a ceramic powder admixed with the intercalated graphite.

20. An electrical contact in accordance with claim 19 wherein the ceramic powder comprises from about 5 wt. per cent to about 85 wt. per cent of said contact and wherein the ceramic powder is selected from the group comprised of silicon nitride, boron carbide, silicon carbide, partially stabilized zirconia, titanium oxides and mixtures thereof

* * * * *